(12) United States Patent
Bergnach et al.

(10) Patent No.: US 11,984,574 B2
(45) Date of Patent: May 14, 2024

(54) BATTERY COOLING PLATE AND FLUID MANIFOLD

(71) Applicant: Modine Manufacturing Company, Racine, WI (US)

(72) Inventors: Michael Bergnach, Kenosha, WI (US); Kyle Shisler, Muskego, WI (US); Thomas Grotophorst, Muskego, WI (US); Christopher Moore, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 17/859,540

(22) Filed: Jul. 7, 2022

(65) Prior Publication Data

US 2022/0336891 A1 Oct. 20, 2022

Related U.S. Application Data

(63) Continuation of application No. 17/258,146, filed as application No. PCT/US2019/040138 on Jul. 1, 2019, now Pat. No. 11,431,045.

(Continued)

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/6554* (2015.04); *H01M 10/6556* (2015.04)

(58) Field of Classification Search
CPC ........... H01M 10/6568; H01M 10/613; H01M 10/6554; H01M 10/6556
(Continued)

(56) References Cited

U.S. PATENT DOCUMENTS 3,334,399 A * 8/1967 Teeguarden .......... F28D 9/0056
29/890.039
4,396,060 A 8/1983 Schenk
(Continued)

FOREIGN PATENT DOCUMENTS

CA 2298116 A1 8/2000
CN 1620588 A 5/2005
(Continued)

OTHER PUBLICATIONS

Machine Translation DE 102013209980A1 (Year: 2014).*
(Continued)

*Primary Examiner* — Claire E Rojohn, III
*Assistant Examiner* — Gustavo A Hincapie Serna
(74) *Attorney, Agent, or Firm* — Michael Best & Friedrich (57) ABSTRACT

A battery cooling plate includes a first plate and a second plate that are joined together at their respective edges, and are spaced apart to define a coolant volume therebetween. Turbulating inserts can be arranged side-by-side within the coolant volume and multiple rods can extend through the turbulating inserts to at least partially define flow barriers between coolant flow channels. A fluid manifold for the battery cooling plate includes a non-planar wall that extends along a length-wise direction of the fluid manifold to separate a fluid volume into a first portion and a second portion. A series of apertures are arranged along the length-wise direction and successive ones of the apertures are fluidly connected to the first portion and to the second portion in alternating sequence.

28 Claims, 9 Drawing Sheets

Related U.S. Application Data (60) Provisional application No. 62/735,236, filed on Sep. 24, 2018, provisional application No. 62/694,201, filed on Jul. 5, 2018.

(51) Int. Cl.
 H01M 10/6554 (2014.01)
 H01M 10/6556 (2014.01)

(58) Field of Classification Search
 USPC .................................................... 165/80.4
 See application file for complete search history.

(56) References Cited

U.S. PATENT DOCUMENTS

| | | | |
|---|---|---|---|
| 5,016,707 A | 5/1991 | Nguyen | |
| 6,199,626 B1 | 3/2001 | Wu et al. | |
| 9,065,158 B2 | 6/2015 | Martz et al. | |
| 9,318,782 B2* | 4/2016 | Hirsch | H01M 10/613 |
| 9,627,724 B2* | 4/2017 | Yum | H01M 10/653 |
| 10,084,217 B2 | 9/2018 | Merriman et al. | |
| 10,345,053 B2 | 7/2019 | Amaya et al. | |
| 10,462,941 B2 | 10/2019 | Dixler | |
| 11,431,045 B2 | 8/2022 | Bergnach et al. | |
| 2001/0007728 A1 | 7/2001 | Ogata et al. | |
| 2003/0164233 A1 | 9/2003 | Wu et al. | |
| 2003/0192677 A1 | 10/2003 | Rong | |
| 2005/0115701 A1 | 6/2005 | Martin et al. | |
| 2005/0145379 A1 | 7/2005 | Thomas et al. | |
| 2005/0274504 A1 | 12/2005 | Torigoe | |
| 2006/0016587 A1 | 1/2006 | Bouzon et al. | |
| 2006/0060335 A1 | 3/2006 | Barr et al. | |
| 2006/0291165 A1 | 12/2006 | Flesch et al. | |
| 2011/0293982 A1 | 12/2011 | Martz et al. | |
| 2012/0107663 A1* | 5/2012 | Burgers | H01M 10/6556 429/120 |
| 2013/0105128 A1 | 5/2013 | Vanderwees | |
| 2013/0171491 A1 | 7/2013 | Wei et al. | |
| 2014/0162107 A1 | 6/2014 | Obrist et al. | |
| 2014/0299302 A1 | 10/2014 | Moreau et al. | |
| 2014/0322571 A1* | 10/2014 | Fabian | H01M 10/625 429/82 |
| 2015/0079442 A1* | 3/2015 | Haussmann | H01M 10/625 429/120 |
| 2015/0090427 A1 | 4/2015 | Brandauer et al. | |
| 2015/0114613 A1 | 4/2015 | Suzuki et al. | |
| 2015/0244038 A1 | 8/2015 | Jairazbhoy et al. | |
| 2016/0036104 A1 | 2/2016 | Kenney et al. | |
| 2016/0049705 A1* | 2/2016 | Mahe | F28F 3/10 29/890.03 |
| 2016/0164148 A1* | 6/2016 | Yum | H01M 10/6551 429/120 |
| 2016/0204486 A1* | 7/2016 | Kenney | H01M 10/6568 29/890.03 |
| 2016/0238323 A1* | 8/2016 | Jones | F28D 1/0375 |
| 2016/0315365 A1* | 10/2016 | Vanderwees | H01M 10/6557 |
| 2016/0356558 A1* | 12/2016 | Franz | F28D 1/05325 |
| 2017/0051987 A1 | 2/2017 | Vanerwees et al. | |
| 2017/0097179 A1 | 4/2017 | Martin | |
| 2017/0106639 A1* | 4/2017 | Vandermeulen | F28F 3/06 |
| 2017/0164516 A1 | 6/2017 | Scolton | |
| 2017/0179555 A1 | 6/2017 | Foerster et al. | |
| 2017/0324132 A1* | 11/2017 | Kenney | H01M 50/24 |
| 2018/0131051 A1 | 5/2018 | Paramasivam et al. | |
| 2018/0166754 A1* | 6/2018 | Dudley | H01M 50/211 |
| 2018/0205125 A1* | 7/2018 | Burgers | F28F 3/12 |
| 2018/0287227 A1 | 10/2018 | Jeong et al. | |
| 2018/0309176 A1* | 10/2018 | Moschet | H01M 10/625 |
| 2018/0337375 A1* | 11/2018 | Kellner | H01M 10/6567 |
| 2019/0077276 A1* | 3/2019 | Capati | H05K 7/20872 |
| 2019/0173139 A1* | 6/2019 | Kellner | H01M 10/6556 |
| 2019/0229384 A1* | 7/2019 | Tasiopoulos | H01M 10/6554 |
| 2019/0356028 A1* | 11/2019 | Cassard | H01M 50/229 |
| 2019/0366877 A1* | 12/2019 | Blersch | B23K 1/0012 |
| 2020/0006822 A1 | 1/2020 | Shisler et al. | |
| 2020/0153000 A1 | 5/2020 | Stohr et al. | |
| 2021/0156628 A1 | 5/2021 | Bonnafous | |
| 2021/0210808 A1* | 7/2021 | Schmitz | H01M 10/613 |
| 2021/0239406 A1 | 8/2021 | Shimizu et al. | |

FOREIGN PATENT DOCUMENTS

| | | | | |
|---|---|---|---|---|
| CN | 102007360 A | | 4/2011 | |
| CN | 202403587 U | | 8/2012 | |
| CN | 103988043 A | | 8/2014 | |
| CN | 104051813 A | | 9/2014 | |
| CN | 104904059 A | | 9/2015 | |
| CN | 105914425 A | | 8/2016 | |
| CN | 105992927 A | | 10/2016 | |
| DE | 102013209980 A1 | * | 12/2014 | ........ F28D 1/05366 |
| EP | 0164327 A1 | | 12/1985 | |
| EP | 3040670 A1 | | 7/2016 | |
| WO | WO9601973 A1 | | 1/1996 | |

OTHER PUBLICATIONS

International Search Report with Written Opinion for related Application No. PCT/US2019/040138 dated Nov. 12, 2019 (10 Pages).

Song et al., Chemical Industry and Engineering Progress, No. S1, Nov. 15, 2017, ; "Simulation of Layered Air Cooling Thermal Management System for Lithium-ion Battery Pack", pp. 187-194 (16 p. including English machine translation).

Chinese Patent Office First Office Action for Application No. 201980052378.7 dated Jan. 8, 2024 (15 pages including English translation).

* cited by examiner

BATTERY COOLING PLATE AND FLUID MANIFOLD

CROSS-REFERENCE TO RELATED APPLICATIONS

This application is a continuation of U.S. application Ser. No. 17/258,146, filed Jan. 5, 2021, which is a 371 application of PCT/US2019/040138, filed Jul. 1, 2019 which claims priority to U.S. provisional patent application No. 62/694,201, filed on Jul. 5, 2018, and to U.S. provisional patent application No. 62/735,236, filed on Sep. 24, 2018, the entire contents of each of which are hereby incorporated by reference in their entirety.

BACKGROUND

Vehicles such as passenger automobiles are increasingly being electrified in order to replace or augment internal combustion engines. Such electric or hybrid-electric vehicles use electrical motors in order to provide, at least in part, the driving force for the wheels. The electrical power that is supplied to the motors is typically provided by a large number of batteries that are installed within the vehicle. Due to the large power loads associated with vehicular transport, the batteries from which such power is extracted experience substantial heating during operation and during charging. Batteries are known to be particularly sensitive to internal operating temperature, as the battery voltage will vary with the battery's internal temperature. As a result, batteries for electric vehicles often require substantial cooling during operation.

Heat exchangers for cooling heat-producing devices such as these batteries are known. These heat exchangers maintain the operating temperature of the heat-producing device within an acceptable operating range by efficiently removing the heat generated by the devices, thereby preventing degradation of the device due to excessive temperatures. Typically, the heat is removed by transfer to a fluid stream such as a coolant that is routed through plates. In such applications, it is often desirable to maintain a predominantly uniform temperature profile over the surface of the plate. Such a uniform temperature profile can be especially desirable in the cooling of batteries, particularly in applications such as electric or hybrid motor vehicle battery cooling.

These heat exchangers are sometimes presented in the form of battery cooling plates. Battery cooling plates to accomplish the requisite cooling of the batteries typically operate by supplying one or more large and generally planar surfaces against which the batteries can be disposed. A liquid (or, in some cases, two-phase liquid-vapor) coolant is circuited through the battery cooling plate, and heat generated by the batteries is transferred through the surface into the coolant flowing through the plate, thereby reducing the temperature of the batteries to a more desirable level.

There are, however, still problems with known battery plates. Often the temperature across the cooling surface of the plate is not uniform, which causes some batteries disposed against the cooling surface or surfaces to be at a different temperature than other batteries disposed against the cooling surface or surfaces. This can result in impaired performance and/or reduced life of the batteries, since the batteries will not all be at an equal voltage and therefore will not share load equally. Among other reasons, this non-uniform surface temperature can be caused by the progressive heating of the coolant as it flows through the battery cooling plate, as well as by the presence of flow routing features formed into the otherwise flat surface of the battery cooling plate.

In order to achieve the desired uniform temperature profile, it can be advantageous to direct the flow of coolant through the heat exchanger in multiple, parallel arranged flow circuits. Such a flow circuiting requires that coolant be manifolded within the heat exchanger in order to distribute the flow of coolant to the multiple parallel flow channels as desired.

SUMMARY

A battery cooling plate includes a turbulating insert that is arranged between a first planar surface and a second planar surface, and is bonded thereto. A first coolant pass extends through the turbulating insert in a first direction, and a second coolant pass extends through the turbulating insert in a second direction that is opposite to the first direction. The first and the second coolant passes are sequentially arranged so that coolant flows first through the first pass and subsequently through the second pass. A flow barrier is arranged between the first coolant pass and the second coolant pass to prevent bypass flow between the two passes.

The flow barrier can be at least partially defined by a convolution of the turbulating insert that extends parallel to the first and the second directions, a rod that is arranged within the convolution, and a pocket that is provided within an embossment that extends from at least one of the first and second planar surfaces. An end of the rod can be received within the pocket. The rod can be joined to the turbulating insert, to at least one of the first and second planar surfaces, and to the embossment by braze alloy.

In some embodiments, the rod can have a circular cross-section. In other embodiments, the rod can have a non-circular cross-section such as a square cross-section, a hexagonal cross-section, an octagonal cross-section, or some other shape.

The embossment can be arranged at one end of the battery cooling plate and a fluid space can be arranged at the opposite end of the battery cooling plate. The fluid space can fluidly couple the first coolant pass to the second coolant pass.

Some embodiments include a first fluid chamber and a second fluid chamber, both of which are located at the same end of the battery cooling plate. The first fluid chamber can be in fluid communication with one of the first and second coolant passes to deliver a flow of coolant thereto, and the second fluid chamber can be in fluid communication with the other of the first and second coolant passes to receive the flow of coolant therefrom. The first and second fluid chambers can be separated from each other by the embossment.

A third coolant pass can extend through the turbulating insert in either the first direction or the second direction and can be hydraulically in parallel with either the first coolant pass or the second coolant pass. A second flow barrier can be arranged between the third coolant pass and that one of the first and second coolant passes that is not hydraulically in parallel with the third coolant pass.

The second flow barrier can be similar to the first flow barrier and can be at least partially defined by a convolution of the turbulating insert that extends parallel to the first and the second directions, a rod that is arranged within the convolution, and a pocket that is provided within an embossment that extends from at least one of the first and second planar surfaces, with an end of the rod received within the pocket. The embossment of the first flow barrier and the embossment of the second flow barrier can be arranged at the same end of the battery cooling plate.

The third coolant pass and that one of the first and second coolant passes that is hydraulically in parallel with the third coolant pass can be arranged upstream of the other one of the first and second coolant passes. During operation of the battery cooling plate, the other one of the first and second coolant passes can receive the combined flow of coolant from the third coolant pass and from that one of the first and second coolant passes. The third coolant pass and that one of the first and second coolant passes that is hydraulically in parallel with the third coolant pass can also be arranged downstream of the other one of the first and second coolant passes. During operation of the battery cooling plate, a flow of coolant from the other one of the first and second coolant passes can be distributed to the third coolant pass and to that one of the first and second coolant passes.

In at least some embodiments, the turbulating insert is one of many turbulating inserts. The rod can be arranged within aligned convolutions of the multiple turbulating inserts to at least partially define the flow barrier.

A battery cooling plate can also or alternatively include a first plate with a first planar surface and a second plate with a second planar surfaces, each of the planar surfaces extending in a length direction and a width direction. The first and the second plates can be joined together at their respective edges, and can be spaced apart to define a coolant volume therebetween. Turbulating inserts can be arranged within the coolant volume and can be joined to the first and the second planar surface. Each one of the turbulating inserts can extend over the full extent of the coolant volume in the width direction, and the turbulating inserts can be arranged side-by-side in the length direction. Multiple rods can extend through the turbulating inserts to at least partially define flow barriers between coolant flow channels that pass through the turbulating inserts.

Each one of the rods can be received within a convolution of each one of the turbulating inserts. Some or all of the rods can be joined to each one of the turbulating inserts by braze joints. In some embodiments each one of the rods has an end closest to a first end of the battery cooling plate that is received within a pocket provided within an embossment extending from at least one of the first and the second plates. In some such embodiments at least some of the rods have an end furthest from the first end of the battery cooling plate that is additionally received within a pocket provided within an embossment extending from at least one of the first and the second plates.

A first rod can at least partially define a first flow barrier and a second rod can at least partially define a second flow barrier. The first rod can have an end furthest from the first end of the battery cooling plate that is received within a pocket provided within a first embossment and the second rod can have an end furthest from the first end of the battery cooling plate that is received within a pocket provided within a second embossment. A fluid space can extend in the width direction and can be bounded at one end by the first embossment and at another end by the second embossment. A first flow channel can be arranged adjacent the first rod, and a second flow channel can be arranged adjacent the second rod. The first and the second flow channels can both extend in the length direction, and can both be fluidly coupled to the fluid space at one end and to a common one of the inlet and outlet manifolds at an opposite end. A third flow channel can be arranged between the first flow channel and the second flow channel. The third flow channel can also extends in the length direction, and can be fluidly coupled to the fluid space at one end and to the other one of the inlet and outlet manifolds at an opposite end. A third flow barrier can be arranged between the first flow channel and the third flow channel, and a fourth flow barrier can be arranged between the second flow channel and the third flow channel. In at least some cases neither the third nor the fourth flow barrier extends into the fluid space.

A coolant inlet manifold and a coolant outlet manifold can each extend along the width direction and can each be joined to one of the first and second plates. The coolant inlet and coolant outlet manifolds can be arranged at one end of the battery cooling plate and can be in fluid communication with the coolant volume. The coolant flow channels can include a first flow channel that is fluidly connected to one of the coolant inlet manifold and the coolant outlet manifold and a second and a third flow channel that is fluidly connected to the other of the coolant inlet manifold and the coolant outlet manifold. The second and the third flow channels can be arranged on opposite sides of the first flow channel. In some such cases, one or both of the second and the third flow channels is fluidly connected to the first flow channel by a fluid space at an end of the battery cooling plate opposite the end where the coolant inlet and outlet manifolds are located.

A fluid manifold for a heat exchanger can include a planar top wall and a planar bottom wall that are spaced apart to define a fluid volume therebetween. A non-planar wall can extend along a length-wise direction of the fluid manifold between the top wall and the bottom wall to separate the fluid volume into a first portion and a second portion. A series of apertures can be arranged along the length-wise direction and can extend through the planar bottom wall. Successive ones of the apertures along the length-wise direction can be fluidly connected to the first portion and to the second portion in alternating sequence.

In some embodiments, the centers of the apertures are arranged in a straight line that extends along the length-wise direction. In some embodiments only some of the apertures are arranged with their centers aligned along a straight line that extends along the length-wise direction.

A first fluid port can be connected to the first portion of the fluid volume and a second fluid port can be connected to the second portion of the fluid volume. In some cases at least one of the fluid ports can extend in the lengthwise direction, and in some particular cases both of the fluid ports extend in the length-wise direction. In some cases at least one of the fluid ports extends outwardly from the planar top surface, and in some particular cases both of the fluid ports extend outwardly from the planar top surface. The fluid ports can define a coolant inlet port and a coolant outlet port for the heat exchanger.

In some embodiments, the fluid manifold can be provided with fastening holes that extend through the planar top wall and through the planar bottom wall. In at least some such embodiments the fastening holes can extend through thickened portions of the non-planar wall. In some embodiments the centers of at least some of the fastening holes can be aligned with the centers of at least some of the apertures in a straight line that extends along the length-wise direction.

The fluid manifold can be constructed of a plastic material, and in at least some embodiments is constructed of at least two plastic parts that are joined together. A first one of the at least two plastic parts provides the planar top wall, and a second one of the at least two plastic parts provides the planar bottom wall. In some embodiments at least one of the fluid ports is provided by the plastic part that provides the top wall, and in some embodiments both fluid ports are provided by that part. In some embodiments at least one of the fluid ports is provided by that plastic part that provides the bottom wall, and in some embodiments both fluid ports are provided by that part. In some embodiments a portion of the non-planar wall is provided by each of the at least two plastic parts, while in other embodiments the non-planar wall is entirely provided by only one of the plastic parts. In some embodiments the at least two plastic parts are joined together to provide a leak-free seal around an outer perimeter of the fluid manifold.

The non-planar wall of the fluid manifold can include a first non-planar surface bounding the first portion of the fluid volume, and a second non-planar surface spaced apart from the first non-planar surface and bounding the second portion of the fluid volume. A cavity can be arranged between the first and the second non-planar surfaces. In some particular cases the cavity is one of several such cavities arranged between the first and the second non-planar surfaces.

The non-planar wall can include a first set of planar wall sections and a second set of planar wall sections, the wall sections of the firsts set and the wall sections of the second set each extending along the length-wise direction. The first set of planar wall sections are offset to one side of the apertures, and the second set of planar wall sections are offset to the opposite side of the apertures. A third set of wall sections join ones of the first set of wall sections to ones of the second set of wall sections. In some cases, each one of the third set of wall sections is arranged between two adjacent apertures. In some cases the third set of wall sections have thickened portions, and fastening holes extend through those thickened portions.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While reference is made herein to a battery cooling plate, which is a heat exchanger that is specifically adapted to cooling heat-producing batteries, it should be understood that such reference is made for exemplary purposes only. The aspects of inventions described herein can be similarly applied and be useful in other heat exchangers for cooling devices other than batteries, as well as to transfer heat between two or more fluid streams, and no limitation strictly to the cooling of batteries should be implied.

Aspects of a battery cooling plate I are depicted in FIGS. 1-7. The battery cooling plate I is constructed as a large flat plate having a broad and flat planar heat transfer surface 30 on each side, to which batteries or other electronic devices needing cooling can be mounted. While in some applications it may be desirable to mount such heat producing devices to only one of the sides 30, the battery cooling plate I is particularly well-suited to double-sided cooling applications.

The battery cooling plate I is constructed using two flat plates 2 and 3 that are bonded together at their peripheral edges. In some particularly preferable embodiments, the plates 2 and 3 are constructed from sheets of brazeable aluminum material and are joined together by brazing. In any event, it is highly desirable that the material from which the plates are constructed has a high thermal conductivity, so that the heat transfer performance of the battery cooling plate is enhanced.

While the plates 2 and 3 are referred to as flat, it should be understood that at least one of the plates has a raised periphery so that a coolant volume 4 is arranged between opposing inwardly facing planar surfaces 15, 16 of the plates 2, 3 respectively. In the exemplary embodiment of the battery cooling plate 1, the plate 2 is flat over the entirety of the plate surface, while the plate 3 has a raised periphery along the edges 13. The plates 2 and 3 are joined together at that raised periphery, which contacts the inwardly facing surface 15 of plate 2. In other embodiments, both the plates can have a raised periphery, with the peripheries of the two plates meeting to form a joining surface.

The battery cooling plate 1 is optionally provided with mounting holes 24 that can be arranged over the surface of the cooling plate. Such mounting holes 24 can be used to mount batteries or other heat producing devices to the heat transfer surfaces 30, as well as to mount the battery cooling plate 1 itself The mounting holes 24 are fluidly separated from the coolant volume 4, such as by being arranged in embossments 32 that extend inwardly from one or both of the plates 2, 3.

Figure 1:
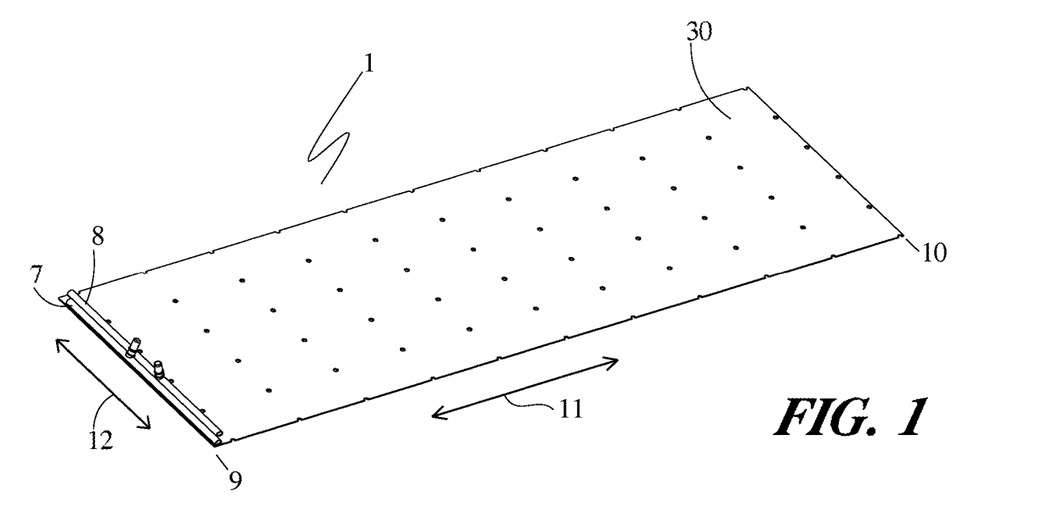
FIG. 1 is a perspective view of a battery cooling plate according to an embodiment of the invention.

The plates 2 and 3, as well as their associated planar surfaces 15 and 16, extend in both a length direction 11 and a width direction 12. As can be seen in FIG. 1, the length direction 11 of the exemplary battery cooling plate 1 is noticeably larger in dimension than the width dimension 12 of the cooling plate. However, it should be noted that this need not be the case in all embodiments, and that "length direction" as used herein is not intended to be interpreted as the direction of the longer dimension and "width direction" as used herein is not intended to be interpreted as the direction of the shorter dimension. Rather, they are used as terms of convenience for describing the arrangement of fluid flows through the cooling plate 1, as will be described hereafter.

The battery cooling plate 1 is further provided with a coolant inlet manifold 7 and a coolant outlet manifold 8, each of which extend along the width direction 12 and each of which are arranged at a first end 9 of the cooling plate 1 in the length direction 11. The coolant inlet manifold 7 and the coolant outlet manifold 8 are arranged side by side at the end 9, and are fluidly connected to the coolant volume 4 within the battery cooling plate 1. As can be seen in the partially exploded view of FIG. 2, the plate 2 is provided with a first series of flanged apertures 28 and a second series of flanged apertures 29, the apertures of each series being in a linear arrangement. The manifolds 7 and 8 are provided with receiving apertures (not shown) that correspond to the flanged apertures 28 and 29, respectively. The manifolds 7, 8 are joined to the plate 2 (preferably during the same joining operation that joins the plates 2 and 3 together) in order to create the aforementioned fluid connections.

The coolant inlet manifold 7 is provided with an inlet port 22, and the coolant outlet manifold 8 is provided with an outlet port 23. The battery cooling plate 1 can be operatively coupled to a coolant system that directs a flow of liquid coolant into the battery cooling plate 1 at a first temperature through the inlet port 22, and that receives the flow of liquid coolant from the battery cooling plate at a second temperature higher than the first temperature through the outlet port 23. In this manner, the battery cooling plate 1 can be used within a thermal management system to remove heat that is generated within batteries that are mounted to the heat transfer surface(s) 30 of the plate 1, thereby maintaining the batteries within a suitable operating temperature range. It should be noted that, while the plate 1 is referred to herein as a battery cooling plate, it can also be used to heat batteries that are mounted to the plate. By way of example, in very cold ambient temperature conditions the batteries might benefit from being elevated in temperature in order to be within the desired operating temperature range. Under such conditions, it is possible for the plate 1 to be used to transfer heat from a heated flow of coolant that is circulated through the coolant volume 4 to the batteries mounted to the heat transfer surface(s) 30. It should further be noted that the plate 1 is not limited to cooling and/or heating batteries, but can also be used to transfer heat to or from other devices that can be mounted to the heat transfer surface(s) 30.

Figure 4:
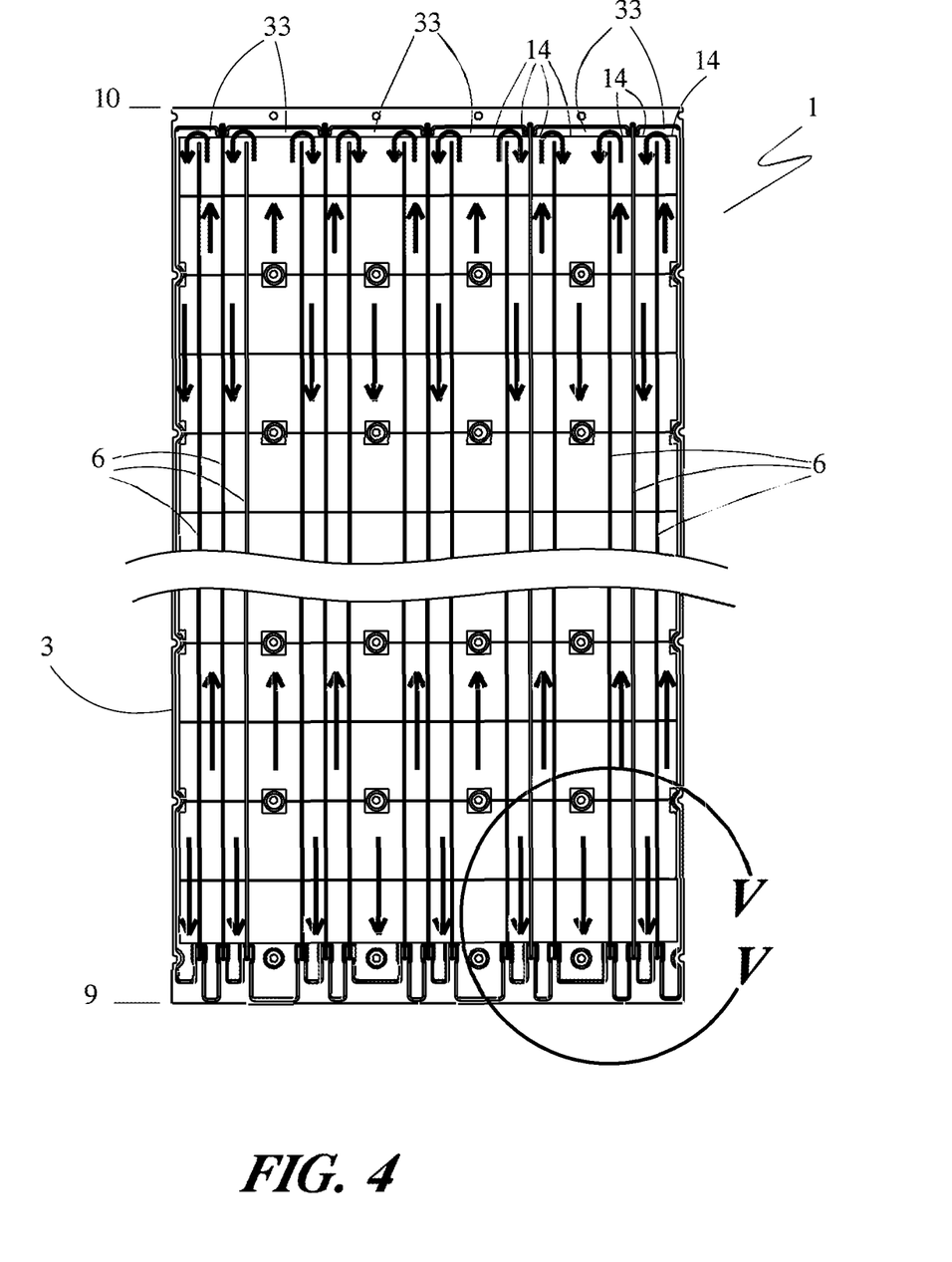
FIG. 4 is a plan view of the battery cooling plate of FIG. 1 with certain components removed to show the coolant routing through the plate.

In order to enhance the heat transfer effectiveness of the battery cooling plate 1, turbulating inserts 5 are located within the coolant volume 4. As can be seen in FIG. 4, multiple turbulating inserts 5 are preferable provided in order to completely fill the coolant volume 4. While in some circumstances (such as when the battery cooling plate 1 is of a particularly small dimension) a single turbulating insert 5 may be used, in most cases it will be preferable to use multiple turbulating inserts 5 due to difficulties in producing a single turbulating insert of sufficient size.

Figure 6:
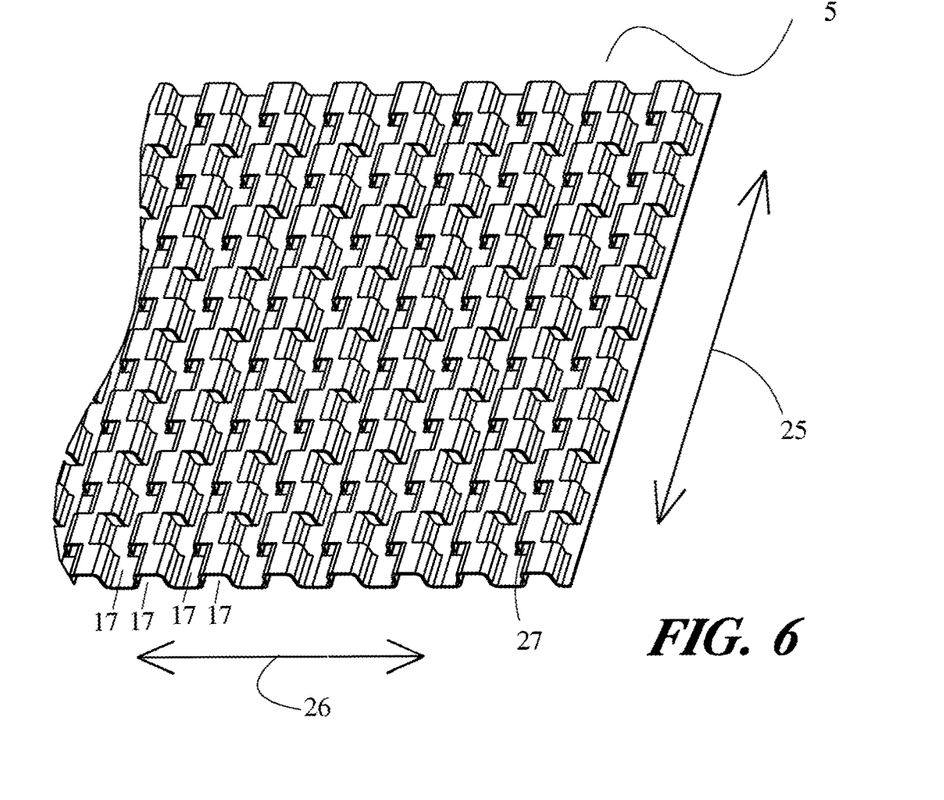
FIG. 6 is a partial perspective view of a turbulating insert used within the battery cooling plate of FIG. 1.

An exemplary turbulating insert that is particularly well-suited for use within the battery cooling plate 1 is depicted in FIG. 6. This turbulating insert 5 is of a lanced and offset variety, and is typically produced from a thin sheet of metal material that is directed through a fin machine, wherein it is formed by stamping and/or rolling operations. The sheet of material typically enters the fin machine having been pre-slit to a width dimension (extending in the direction indicated by the double-ended arrow 25), and is fed through the machine in the direction indicated by the double-ended arrow 26. The forming of the sheet material produces convolutions 17 that extend in the direction 25. Along that direction, the material is lanced and is then offset in alternatingly opposing directions parallel to the sheet feed direction 26, thereby creating a series of apertures 27 along each convolution 17. The apertures 27 allow for fluid flow between adjacent convolutions 17, so that the turbulating insert 5 is porous to fluid flow in both the direction 25 and the direction 26. It should be recognized that a fluid will flow more easily along the length of the corrugations 17 (i.e. in the direction 25) than perpendicular to the length of the corrugations 17 (i.e. in the direction 26). Consequently, the direction 25 is often referred to as the "low pressure-drop direction" and the direction 26 is often referred to as the "high pressure-drop direction".

The sheet of material from which the turbulating inserts 5 are formed is typically provided in spool form, allowing for a sheet of great length. Consequently, the turbulating inserts 5 can be provided with a dimension in the direction 26 that is practically unlimited. In contrast, the dimension of the turbulating inserts in the direction 25 is limited by the size of the fin machine, as well as by the forces required for the forming operations, which typically are performed on an entire convolution 17 at a time. The turbulating inserts 5 are therefore provided with a dimension in the high-pressure drop direction 26 that is sufficient to extend over the full extent of the coolant volume 4 in the direction 12. The turbulating inserts are arranged side-by-side along the direction 11 in order to extend over the full extent of the coolant volume 4 in that direction. By arranging the turbulating inserts in this manner, the low pressure-drop direction 25 of the turbulating inserts 5 is aligned with the direction 11, so that fluid flowing through the coolant volume 4 can be easily directed between the ends 9 and 10 of the battery cooling plate 1.

Figure 5:
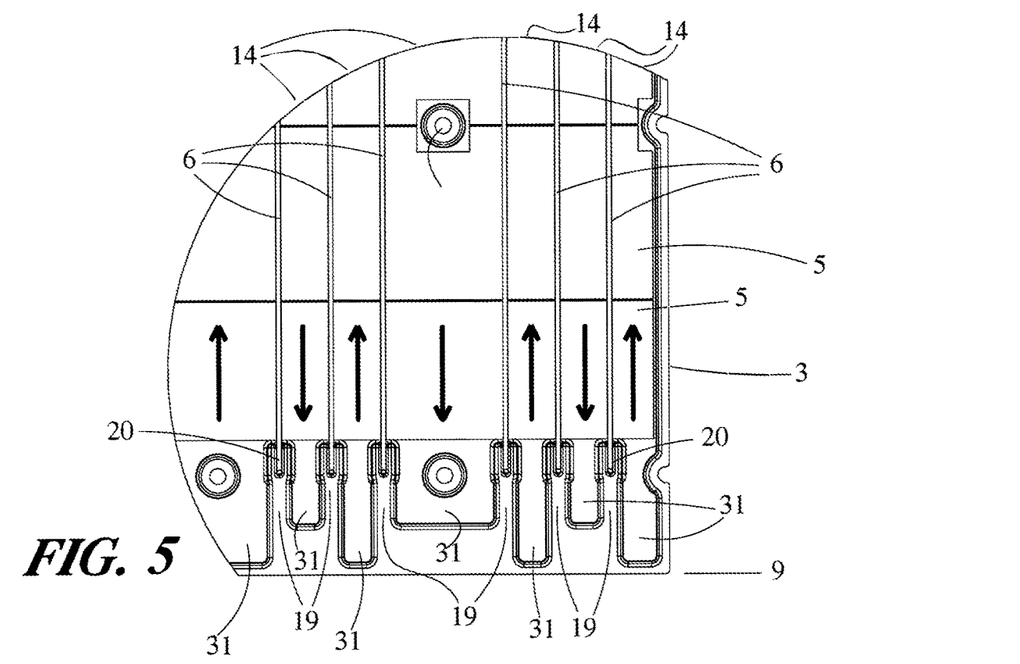
FIG. 5 is a detail view of the portion V-V of FIG. 4.

The fluid flow through the coolant volume 4 is illustrated by the use of arrows in FIGS. 4 and 5. The flow is directed through multiple flow paths arranged to be hydraulically in parallel, each encompassing two passes through the coolant volume 4. The first pass of each flow path extends from the end 9 of the battery cooling plate 1 to the end 10, and the second pass of each flow path extends from the end 10 back to the end 9. Each pass is provided by a flow channel 14 that extends successively through each one of the turbulating inserts 5 in the direction 25. Spaces 33 are provided at the end 10 of the battery cooling plate 1 to hydraulically connect each one of the flow channels 14 to at least one, and sometimes two, adjacent flow channels 14. Adjacent flow channels 14 are hydraulically separated from one another along the length direction 25 of the coolant volume 4, other than at the spaces 33, by way of flow barriers 6.

Each of the flow channels 14 begins or terminates at the end 9 of the battery cooling plate 1 in a fluid chamber 31. The fluid chambers 31 are arranged directly below the coolant inlet and outlet manifolds 7, 8. Along the direction 26, the fluid chambers 31 are fluidly coupled to the coolant inlet manifold 7 and the coolant outlet manifold 8 in alternating sequence, by way of the flanged apertures 28 and 29, respectively. As a result, the flow channels 14 direct fluid from the end 9 towards the end 10 and from the end 10 towards the end 9 in alternating sequence along the width of the plate 1.

The fluid chambers are separated from one another, and are at least partially defined, by embossments 19 that extend from at least one of the plates 2, 3. The embossments 19 each extend from the edge 9 of the cooling plate 1 to the nearest one of the turbulating inserts 5, and preferably abut the end of the turbulating insert 5.

As depicted in FIG. 4, some of the flow channels 14 receive fluid flow from both adjacent channels 14, and some other of the flow channels 14 direct fluid flow to both adjacent channels 14. Those flow channels 14 that receive flow from, or direct flow to, two other channels 14 are preferably twice as large in the direction 26 as their adjacent channels 14, so that the amount of fluid flow per cross-sectional area of the flow channels 14 is approximately constant.

The flow barriers 6 are arranged between adjacent flow channels 14 in order to prevent the undesirable bypass of fluid flow between adjacent channels, other than at the spaces 33. Each flow barrier 6 is at least partially defined by a rod 18 that is received within a convolution of each one of the turbulating inserts 5. The rods 18 extend continuously in the length direction 11 over most, and in some case all, of the length of the flow channels 14. The end 21 of each rod 18 is received within a pocket 20, each of the pockets 20 being provided within an embossment 19.

Figure 7:
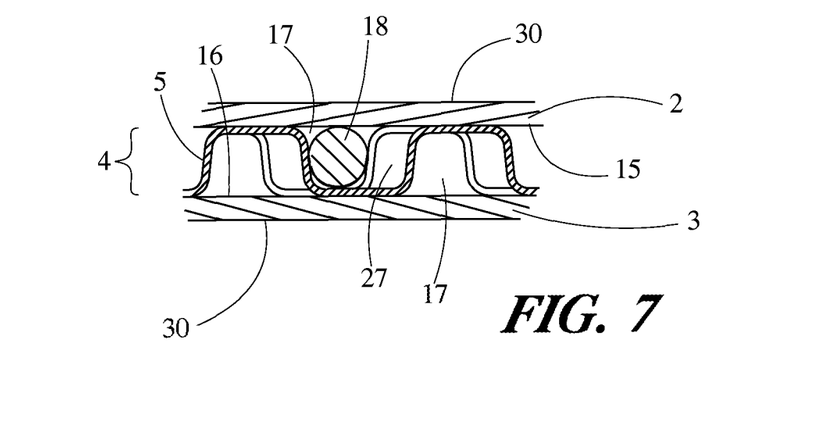
FIG. 7 is a partial cross-sectional view through a flow barrier of the battery cooling plate of FIG. 1.
Figure 8:
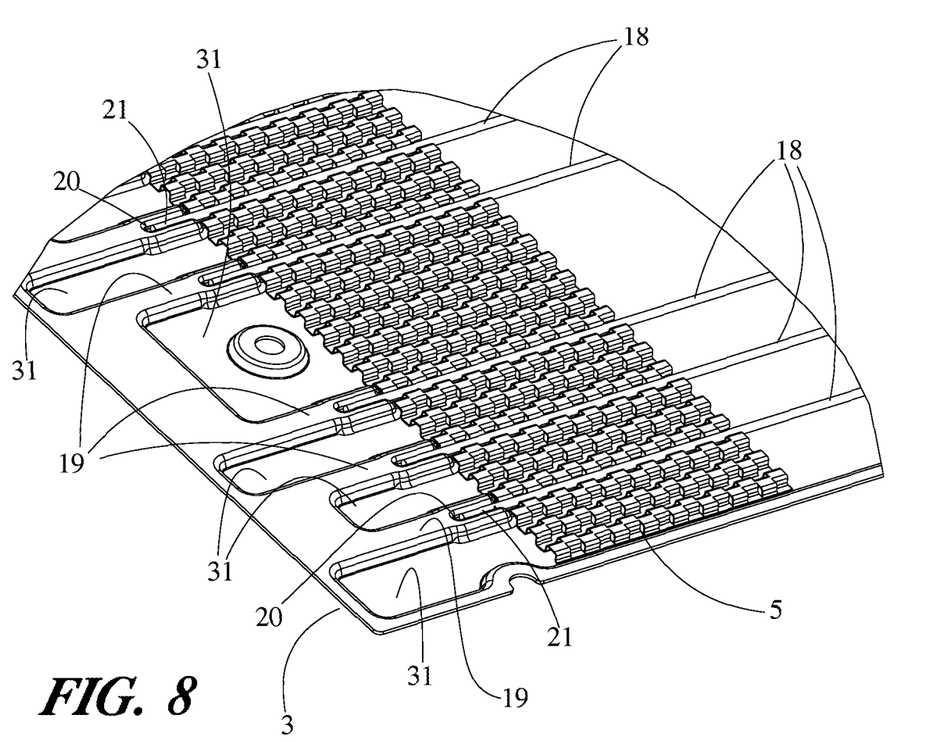
FIG. 8 is a partial perspective view of the battery cooling plate of FIG. 1, with select components removed for clarity.

The size of the rod 18 is preferably such that is approximately equal to the height of the coolant channel 4 minus the thickness of the sheet material for the turbulating inserts 5, as can be seen in the sectional view of FIG. 7. Furthermore, the convolutions 17 are preferably sized so that a rod 18 can be nestled between the opposing offsets at either side of the convolution 17, as also shown in FIG. 7. In this manner, the rods 18 can be securely retained in position during the assembly of the battery cooling plate 1. The pockets 20 can likewise be sized to precisely and securely retain the ends 21 of the rods 18. While the rods 18 of the exemplary embodiment are circular in cross-section, in other embodiments the rods may have a different, non-circular cross-section. By way of example only, the rod cross-section can be square, rectangular, triangular, hexagonal, octagonal, etc.

Additional embossments 19 with pockets 20 are provided adjacent the end 10 of the battery cooling plate 1, and can be used to separate adjacent ones of the spaces 33. The number of such embossments at the end 10 is preferably less than the number of embossments 19 at the end 9, so that the locations of the pockets 20 at the end 10 correspond to less than all of the flow barriers 6. The rods 18 of those flow barriers 6 that do correspond to the locations of the pockets 20 at the end 10 are longer in length, such that an end of those rods opposite the ends 21 are also received within those pockets 20, thereby extending those flow barriers 6 to the full length of the coolant volume 4 in the direction 11.

The components that define each flow barrier 6 are preferably joined together during a brazing of the battery cooling plate 1 in order to create a predominantly fluid-tight flow barrier 6. In some embodiments this joining can be accomplished by providing a layer of braze alloy cladding on the surfaces of one or more of the components, such as (for example) the rods 18, the turbulating inserts 5, the plates 2 and/or 3, etc. In some embodiments the joining can also or alternatively be provided by braze alloy in a paste form that is applied to the rods 18 prior to their insertion into the assembly.

Forming the flow barriers 6 in this manner is advantageous over forming flow barriers by deforming one or both of the plates 2, 3 to define flow barriers. Forming flow barriers out of the plate surfaces has the undesirable effect of reducing the available surface area to which heat from the batteries mounted to the plates can be rejected. Furthermore, the forming operations required to produce flow barriers that extend over plates having a long dimension in the flow barrier can be difficult and expensive, leading to increased cooling plate cost.

By separating the coolant volume 4 into the series of flow channels 14, a more uniform temperature profile can be achieved over the heat transfer surface(s) 30. Along the width direction 12, a uniform temperature profile is achieved by the separation of the coolant volume 4 in that direction into multiple flow paths, each of which are hydraulically in parallel. Along the length direction 11, a uniform temperature profile is achieved through the averaging effect that is achieved by having coolant that is progressively further from the inlet manifold 7 in each of the first passes being immediately adjacent to coolant that is progressively further from the outlet manifold 8 in each of the second passes. Since the coolant is heated by the batteries as it passes along the flow path during the operation of the cooling plate 1, thereby continuously increasing in temperature along the flow path, such an arrangement allows for an averaging of the temperature of the heat transfer surface 30 that is fairly uniform along the direction 11.

Figure 9:
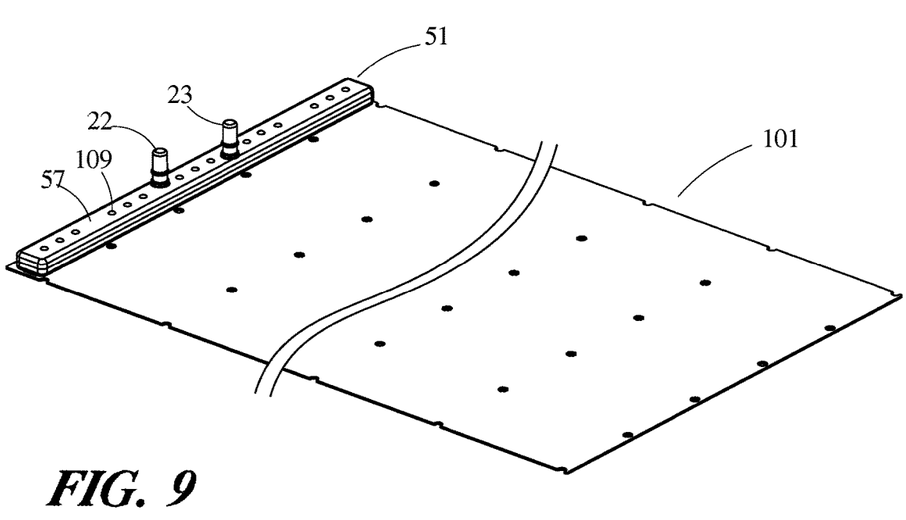
FIG. 9 is a perspective view of of the battery cooling plate of FIG. 1 with a fluid manifold according to another embodiment of the invention.
Figure 10:
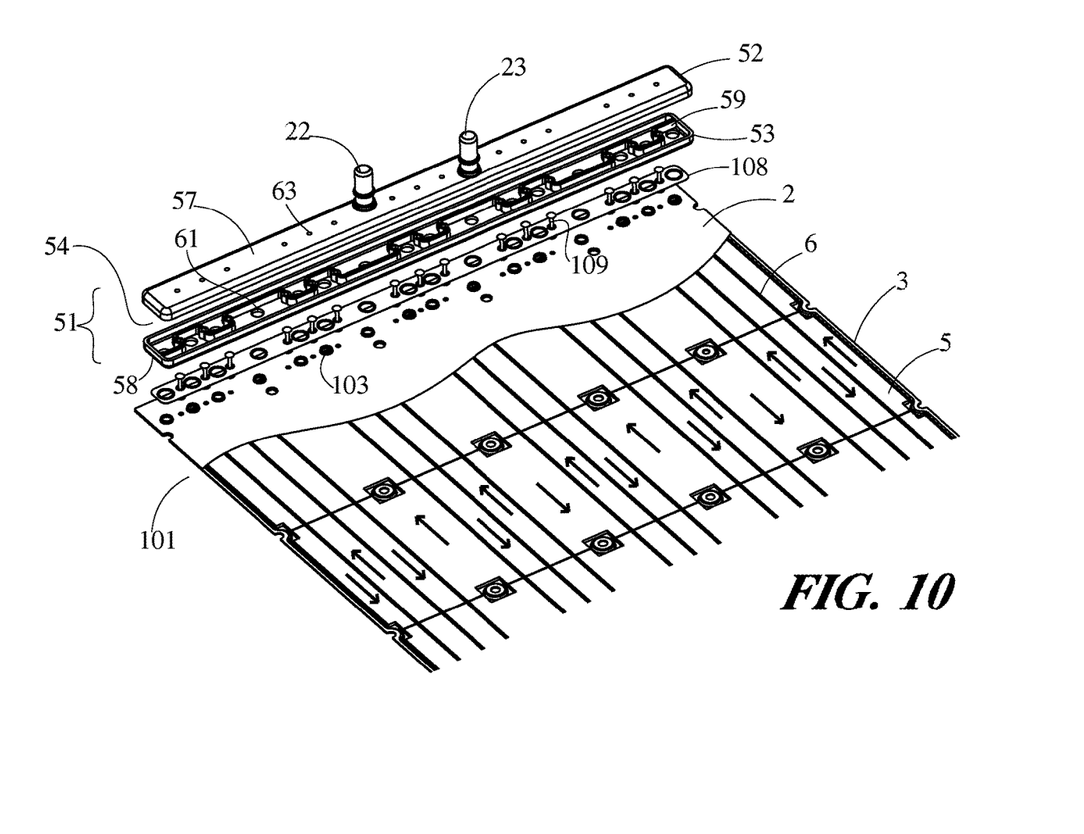
FIG. 10 is a partially exploded perspective view of the battery cooling plate of FIG. 9, with certain internal features exposed.
Figure 11:
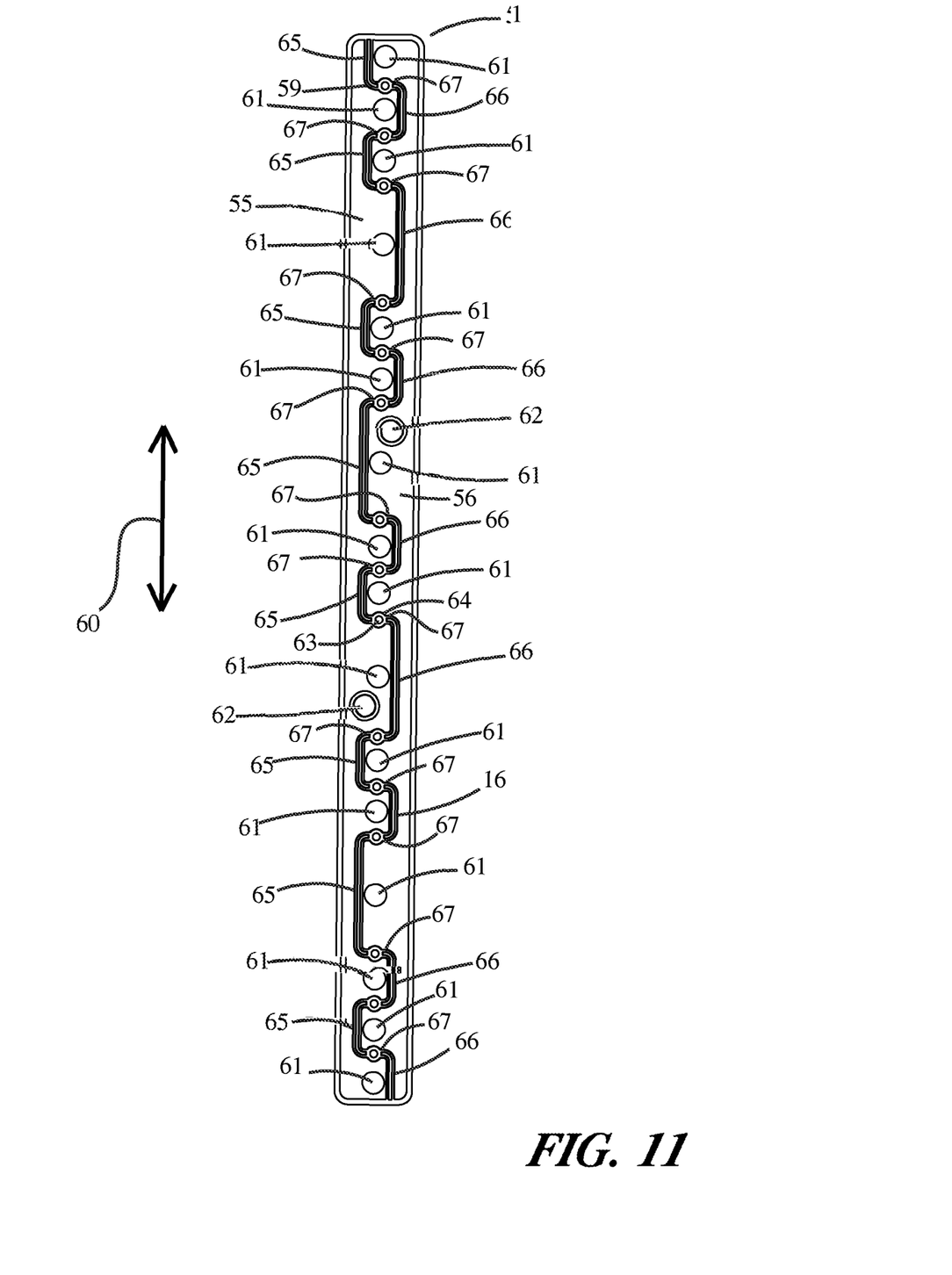
FIG. 11 is a top plan view of the fluid manifold shown in FIG. 9.
Figure 12:
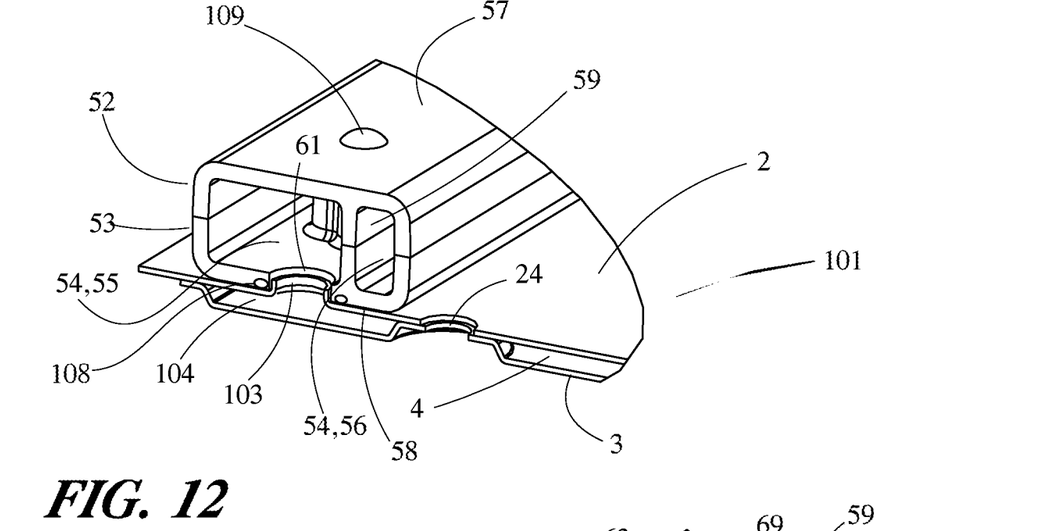
FIG. 12 is a partial section view of the battery cooling plate of FIG. 9.

FIGS. 9 and 10 depict a battery cooling plate 101 that is similar in construction to the battery cooling plate 1 described earlier. The battery cooling plate 101 includes a single fluid manifold 51 to replace the separate coolant inlet manifold 7 and coolant outlet manifold 8 of the cattery cooling plate 1. It should be understood that, while the fluid manifold 51 may be especially advantageous when applied as a portion of a plate style heat exchanger 101 as shown, it can also be used with a wide variety of heat exchanger styles and types and is not limited to use solely as part of a battery cooling plate.

The fluid manifold 51 is joined to the top plate 2 of the battery cooling plate 101 in order to deliver the coolant to, and to receive the coolant from, the coolant volume 4. The fluid manifold 51 is arranged at one end of the battery cooling plate 101 and extends along that end of the battery cooling plate 101 in a length-wise direction 60 of the fluid manifold 51, the length-wise direction being generally aligned with the width direction 12 of the battery cooling plate. The fluid manifold 51 includes a top wall 57 and a bottom wall 58, between which is disposed a fluid volume 54. A non-planar wall 59 extends between the top wall 57 and the bottom wall 58, and divides the fluid volume 54 into a first portion 55 and a second portion 56. The non-planar wall 59 extends along the length-wise direction 60 in a meandering fashion in order to provide separation between the first and second portions 55 and 56 of the fluid volume 54.

As previously described with reference to FIG. 4, and as shown again in FIG. 10, the coolant volume 4 of the battery cooling plate 101 is divided into a series of parallel arranged sections by flow barriers 6 that extend along a length of the battery cooling plate 101 in a direction that is perpendicular to the length-wise direction 10 of the fluid manifold 51. The flow barriers 6 can be provided as separate barrier pieces that are assembled into the formed plate 102, or alternatively can be formed into the plate 102 or into the plate 101. The previously-described turbulating flow inserts 5 can optionally be placed into the fluid space 104 between the flow barriers 106.

As also previously described with reference to FIG. 4, and as shown again in FIG. 10, the direction of the fluid flow through adjacent ones of the parallel arranged sections of the battery cooling plate 101 alternates between flowing away from and flowing towards the fluid manifold 51. Although not shown in the FIG. 10, at the end of the battery cooling plate 101 opposite the fluid manifold 51, at least some of the flow barriers 6 terminate prior to the end of the battery cooling plate 101 so that the coolant flowing through each one of the parallel arranged sections wherein the coolant is directed away from the fluid manifold 51 can be redirected to flow through an adjacent one of the parallel arranged sections wherein the coolant flows back to the fluid manifold 51, as seen in FIG. 4.

In the exemplary embodiment, some of the parallel arranged sections have a flow width (as measured along the length-wise direction 60 of the fluid manifold 51) that is wider than the flow width of adjacent sections, and particularly approximately twice the width of those adjacent sections. Those wider sections can be hydraulically connected to be in series with both of the adjacent sections, so that coolant flowing away from the fluid manifold 51 through the wider sections is divided among the two immediately adjacent narrower sections and flows back to the fluid manifold 51 along those two sections, and so that coolant flowing towards the fluid manifold 51 through the wider sections is the combined flow of coolant from the two immediately adjacent narrower sections. It should be understood, however, that the width of the sections can vary in an alternative manner, or can be uniform along the entire battery cooling plate 101.

Flowing the coolant through the battery cooling plate 101 along multiple parallel arranged sections in this manner can provide certain advantages, especially when the battery cooling plate 101 is used as a battery cooling plate. Greater temperature uniformity over the cooling surface of the top plate 101 can be achieved with such a flow configuration, both in comparison to multiple sequentially arranged passes through the battery cooling plate 101 and in comparison to a single two-pass circuit. Such greater temperature uniformity is known to improve the performance and the durability of the batteries being cooled by the cooling plate.

A series of flanged holes 103, similar to the flanged apertures 28 and 29, is provided within the top plate 101 directly below the fluid manifold 51. Each of the flanged holes 103 corresponds to one of the parallel arranged sections of the fluid space 104. As best seen in the detail view of FIG. 4, each of the flanged holes 103 additionally corresponds to one of a series of apertures 61 that extend through the planar bottom wall 58 of the fluid manifold 51. The apertures 61 are preferably sized so that the flange of the hole 103 can extend at least partially into the aperture 11, thereby facilitating the alignment of the fluid manifold 51 to the top plate 2 of the battery cooling plate 101. In other alternative embodiments, the holes 103 can be provided without flanges, and other alignment features can be incorporated into the top plate 2 or into the fluid manifold 51 or both.

The series of apertures 61 are, in the exemplary embodiment, arranged so that their centers are aligned in a straight line extending along the length-wise direction 60 of the fluid manifold. The non-planar wall 59 is arranged so that the apertures 61 are alternatingly arranged on opposing sides of the wall 59. In this manner, successive ones of the apertures 61 are alternatingly in fluid communication with the portion 55 and with the portion 56 of the fluid volume 54. As a result, the holes 103 and their corresponding portions of the coolant volume 4 within the battery cooling plate 101 are also alternatingly coupled to the portions 55 and 56.

Figure 2:
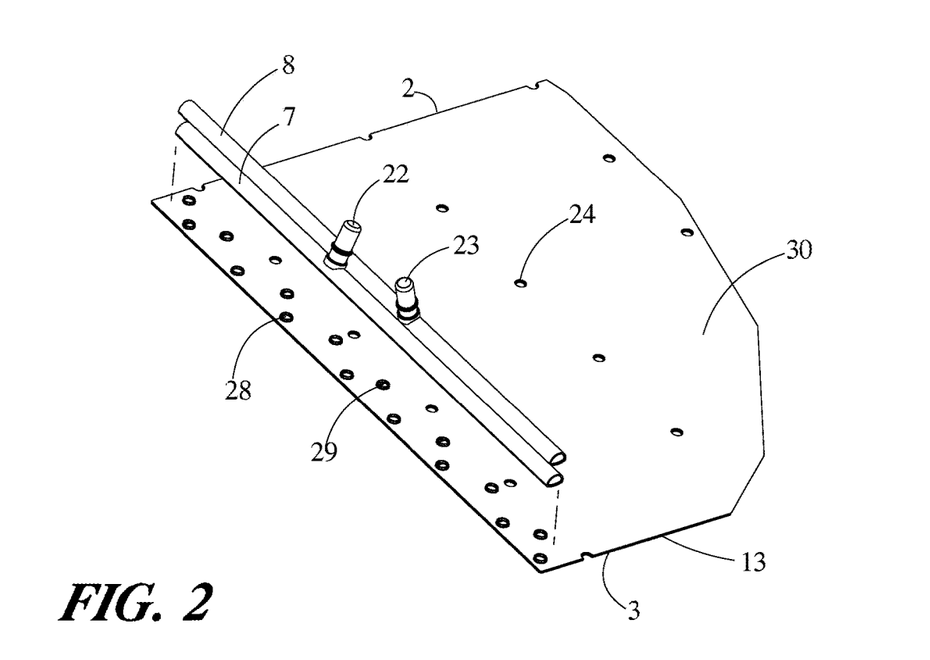
FIG. 2 is a partially exploded perspective view of a portion of the battery cooling plate of FIG. 1.
Figure 3:
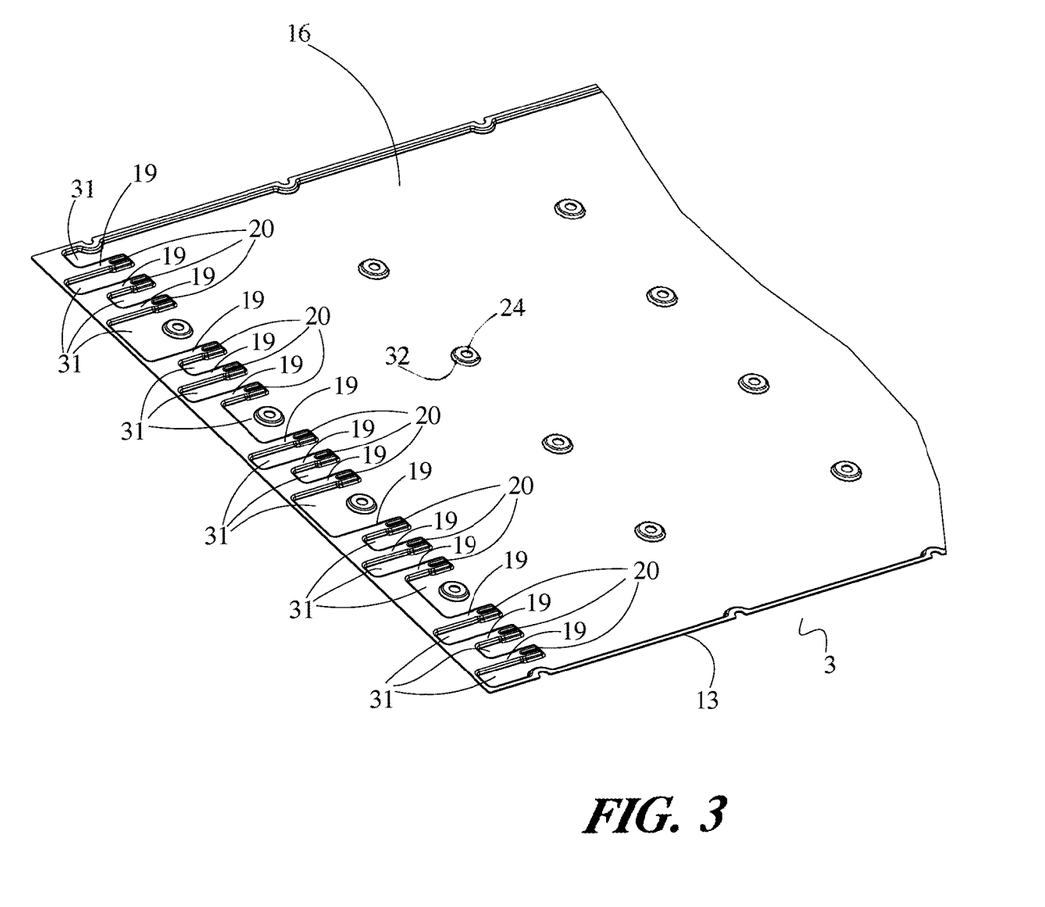
FIG. 3 is a partial perspective view of a single plate used within the battery cooling plate of FIG. 1.

The fluid manifold 51 is further provide with a pair of fluid ports 22, 23 that function similarly to the like-numbered ports of the embodiment of FIG. 2. In the exemplary embodiment of FIGS. 9 and 10, the fluid ports 22, 23 are both provided as part of the top wall 57 of the manifold, although other arrangements of the fluid ports can be contemplated. The fluid port 22 provides fluid communication with the portion 55 of the fluid volume 4, and the fluid port 23 provides fluid communication with the portion 56. The fluid port 22 thus functions as a fluid inlet port for the battery cooling plate 101 when the heat exchanger is coupled into a thermal system, while the fluid port 23 functions as a fluid outlet port for the battery cooling plate 101. During operation of the battery cooling plate 101, a flow of liquid coolant is received into the inlet port 22, and is directed by way of the corresponding portion 55 of the fluid volume 54 to flow through portions of the coolant volume 4 in a direction away from the fluid manifold 51. The flow of liquid coolant is subsequently directed back to the fluid manifold 51 through other portions of the coolant volume, and is received into the portion 56 of the fluid volume 54 of the fluid manifold 51 and is removed by way of the outlet port 23.

Particularly, the non-planar wall 59 includes a first set of wall sections 65 that extend in the length-wise direction 60 and that are offset to one side of the apertures 61, and a second set of wall sections 66 that extend in the length-wise direction 60 and that are offset to the opposite side of the apertures 61. A third set of wall sections 67 extend between ends of the wall sections 65 and ends of the wall sections 66 to join the sections together into the continuous non-planar wall 59. Each one of the third sect of wall sections 67 is located between two adjacent ones of the apertures 61. As a result, the non-planar wall 59 defines a first non-planar surface 68 that extends the entire length of the fluid manifold 51 and that bounds the portion 56 of the fluid volume 54, and a second non-planar surface 69 that also extends the entire length of the fluid manifold 51 and that bounds the portion 55 of the fluid volume 54. The surfaces 68 and 69 are spaced apart by the thickness of the non-planar wall 59.

The fluid manifold 51 can be constructed of several plastic parts that are joined together prior to assembly to the top plate 2. In the exemplary embodiment of FIGS. 9-12, the fluid manifold 51 includes a first part 52 that provides the top wall 57, and a second part 53 that provides the bottom wall 58. The non-planar wall 89 is provided in part by the first part 52, and in part by the second part 53. In other embodiments, the non-planar wall 59 can be provide entirely by only one of the parts 52, 53. The plastic parts 52, 53 are joined together by gluing, hot plate welding, vibration welding, ultrasonic welding, or other known techniques for joining together plastic parts. In this manner, a leak-free seal is provided around an outer perimeter of the fluid manifold 51 to prevent the undesirable leakage of coolant from the fluid manifold 51 during operation of the battery cooling plate 101. A leak-free internal seal between the portions 55 and 56 of the fluid volume 54 can simultaneously be created to prevent the coolant from passing between the portions 55, 56 without passing through the coolant volume 4.

Figure 13:
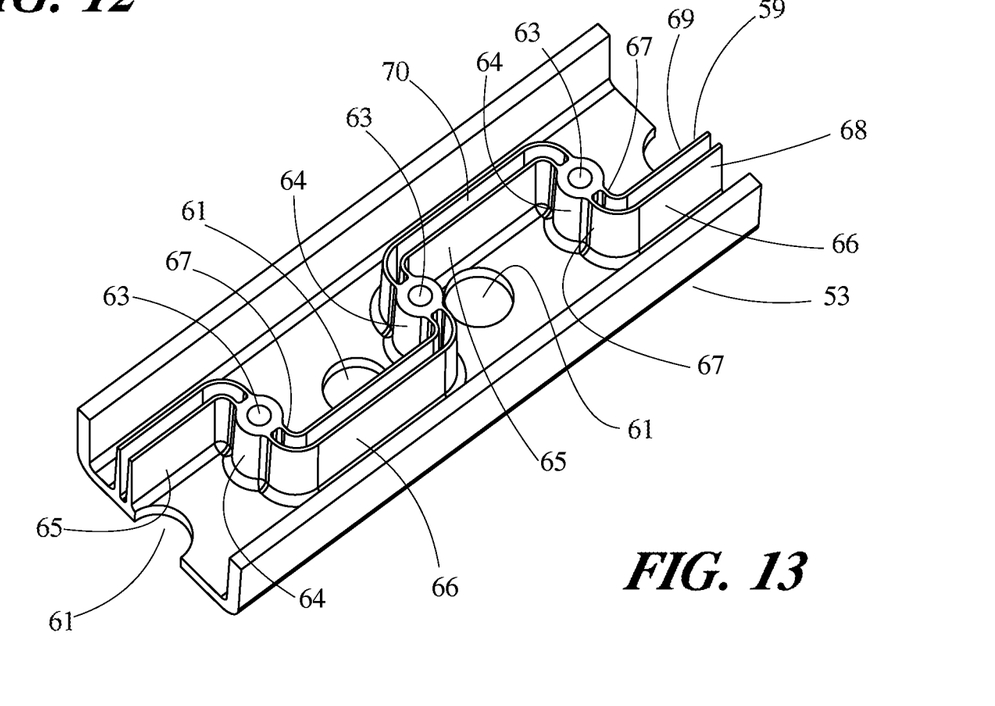
FIG. 13 is partial view of an embodiment of a component of the fluid manifold shown in FIG. 9.

By constructing the fluid manifold 51 from a low thermal conductivity plastic material, the undesirable transfer of heat through the non-planar wall 59 between the coolant in the first portion 54 and the coolant in the second portion 56 can be reduced. In some particular embodiments, such as the embodiment depicted in FIG. 13, the non-planar wall 59 can additionally be provided with a cavity 70 between the surfaces 68 and 69 along at least some portions of the non-planar wall 59 to further reduce this undesirable transfer of heat.

The fluid manifold 51 can be mechanically secured to the plates 2, 3 by way of mechanical fasteners such as rivets 109. The rivets 109 extend through fastening holes 63 that are provided by the fluid manifold 51, and further extend through corresponding holes provided in the plates 2, 3. The fastening holes extend continuously through the fluid manifold 51 from the top wall 57 to the bottom wall 58. Thickened portions 64 of the non-planar wall 59 can be provided at the locations of the fastening holes 63, so that the holes 63 can be fluidly isolated from the fluid volume 54, thereby preventing the leakage of coolant from the fluid manifold 51 through the fastening holes 63.

In order to prevent leakage of the coolant at the joint between the fluid manifold 51 and the top plate 2, a gasket 108 can be arranged between the manifold and the top plate. The gasket 108 can be provided with openings at the locations of the apertures 61 and the flanged holes 103 to allow for the passage of coolant through the gasket 108, and can have compressible regions surrounding those openings. As the fluid manifold 51 is assembled to the top plate 2 by the rivets 109, the compressible portions of the gasket 108 are compressed between the bottom wall 58 of the fluid manifold 51 and the top plate 2, thereby creating a fluid-tight seal to prevent coolant leakage.

It should be understood that the rivets 109 depict only one potential type of fastening means for securing the fluid manifold to the plates 2, 3. Various other alternative types of mechanical fasteners such as screws, clips, etc. could alternatively be used to achieve a similar result. In some embodiments it may be desirable to incorporate at least a portion of the fastener into the plates 2 or 3, such as by way of a stud that extends up from the plates. In still other embodiments the fastener can be incorporated into one of the parts of the fluid manifold 51 itself, such as heat staking bosses that project from the bottom wall 58 and that are thermoplastically deformed to secure the fluid manifold 51 to the plates 2, 3.

Figure 14:
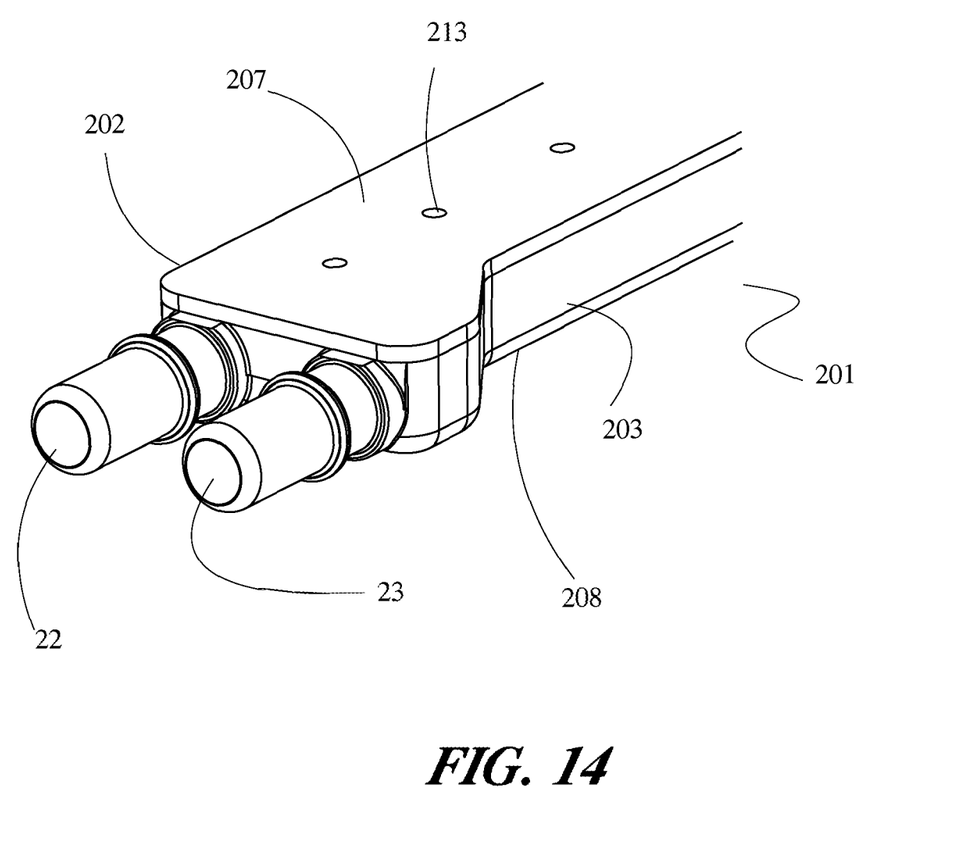
FIG. 14 is a partial view of an alternative embodiment of the fluid manifold shown in FIG. 9.

FIG. 14 depicts an alternative embodiment 201 of the fluid manifold, constructed of a first plastic part 202 joined to a second plastic part 203. In the alternative embodiment 201, the first part 202 has been simplified to a flat part providing the top wall 207 (including the fastening holes 213), and the majority of the features, including the bottom wall 208, the fluid ports 222 and 223, and the non-planar wall (not shown) are provided by the second part 203. Such an embodiment can allow for lower manufacturing costs by having only the second part 203 be an injection-molded plastic part, with first part 202 being produced by simpler methods such as stamping.

It should be understood that various aspects of the different embodiments can be combined. By way of example, the embodiment of FIG. 9 shows both fluid ports extending outwardly from the part containing the top wall, whereas the embodiment of FIG. 14 shows both fluid ports extending in the lengthwise direction from the part containing the bottom wall. In some embodiments it may be preferable to have one fluid port provided by the part containing the top wall and extending perpendicular to the top wall, and to have the other fluid port provided by the part containing the bottom wall and extending in the lengthwise direction.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A cooling plate comprising:
a first plate including first edges defining a first perimeter, a plurality of first mounting holes, and a first planar surface extending in a length direction and in a width direction;
a second plate including second edges defining a second perimeter, a plurality of second mounting holes, and a second planar surface extending in the length direction and in the width direction, the first plate and the second plate joined at the first edges and the second edges such that the first and second planar surfaces are spaced apart to define a coolant volume therebetween, wherein the coolant volume includes
a first coolant pass extending in a first direction, and
a second coolant pass extending in a second direction opposite the first direction; and
a flow barrier arranged along the first coolant pass and the second coolant pass to prevent bypass flow between the first and second coolant passes,
wherein the cooling plate further comprises a fluid manifold joined to one of the first plate and the second plate, wherein the manifold includes:
a planar top wall and a planar bottom wall spaced apart to define a fluid volume therebetween;
a non-planar wall extending along a length-wise direction of the fluid manifold between the planar top wall and the planar bottom wall to separate the fluid volume into a first portion and a second portion;
a coolant inlet port fluidly connected to the first portion of the fluid volume and the first coolant pass and a coolant outlet port fluidly connected to the second portion of the fluid volume and the second coolant pass;
a plurality of apertures arranged along the length-wise direction and extending through the planar bottom wall, successive ones of the plurality of apertures along the length-wise direction being fluidly connected to the first portion and to the second portion in alternating sequence, and
wherein the fluid manifold includes a plurality of fastening holes extending through the planar top wall and the planar bottom wall.

2. The cooling plate of claim 1, wherein the plurality of first mounting holes are aligned with the plurality of second mounting holes, and wherein the plurality of first mounting holes and the plurality of second mounting holes are fluidly separated from the coolant volume and are used to mount a heat producing device in a heat transfer relationship with one of the first plate or the second plate.

3. The cooling plate of claim 2, wherein the heat producing device is a battery.

4. The cooling plate of claim 1, wherein the flow barrier is formed by deforming the first plate, the second plate, or the first and second plates, and wherein the first plate and the second plate are joined at the flow barrier.

5. The cooling plate of claim 4, wherein the first edges are formed by deforming the first plate, the second edges are formed by deforming the second plate, or the first edges are formed by deforming the first plate and the second edges are formed by deforming the second plate.

6. The cooling plate of claim 5, wherein each aligned pair of the first plurality of mounting holes and the second plurality of mounting holes defines a through hole formed within at least one embossment extending inwardly from the first plate, extending inwardly from the second plate, or extending inwardly from both the first plate and the second plate.

7. The cooling plate of claim 6, wherein the first plate and the second plate are joined at the embossment.

8. The cooling plate of claim 7, wherein one of the first coolant pass and the second coolant pass is defined by elongated lateral boundaries, wherein each of the elongated lateral boundaries is defined by the flow barrier, the first edges, the second edges, or the first edges and second edges.

9. The cooling plate of claim 8, wherein the embossment is formed at an elongated lateral boundary.

10. The cooling plate of claim 1, wherein the plurality of first mounting holes is located interior to the first edges and the plurality of second mounting holes is located interior to the second edges.

11. The cooling plate of claim 1, wherein the plurality of first mounting holes is located at the first edges and the plurality of second mounting holes is located at the second edges.

12. The cooling plate of claim 1, further comprising a coolant inlet manifold and a coolant outlet manifold each extending along the width direction and each joined to one of the first plate and the second plate.

13. The cooling plate of claim 12, wherein both the coolant inlet manifold and the coolant outlet manifold are arranged at a first end of the cooling plate in a length direction and both being fluidly communicative with the coolant volume.

14. The cooling plate of claim 13, wherein the first coolant pass is fluidly connected to the coolant inlet manifold and the second coolant pass is fluidly connected to the coolant outlet manifold.

15. The cooling plate of claim 1, wherein the coolant inlet port and the coolant outlet port both extend outward from the planar top wall.

16. The cooling plate of claim 1, wherein at least one of the coolant inlet port and the coolant outlet port extends in the length-wise direction.

17. The cooling plate of claim 1, wherein the plurality of fastening holes extend through thickened portions of the non-planar wall.

18. The cooling plate of claim 1, wherein the fluid manifold includes a first plastic part that provides the planar top wall and a second plastic part that provides the planar bottom wall.

19. The cooling plate of claim 18, wherein at least one of the coolant inlet port and coolant outlet port is provided by the first plastic part.

20. The cooling plate of claim 1, wherein the non-planar wall includes a first non-planar surface bounding the first portion of the fluid volume, a second non-planar surface spaced apart from the first non-planar surface and bounding the second portion of the fluid volume, and a cavity arranged between the first non-planar surface and the second non-planar surface.

21. A cooling plate comprising:
a first plate including first edges defining a first perimeter, a plurality of first mounting holes, and a first planar surface extending in a length direction and in a width direction;
a second plate including second edges defining a second perimeter, a plurality of second mounting holes, and a second planar surface extending in the length direction and in the width direction, the first plate and the second plate joined at the first edges and the second edges such that the first and second planar surfaces are spaced apart to define a coolant volume therebetween, wherein the coolant volume includes
a first coolant pass extending in a first direction, and
a second coolant pass extending in a second direction opposite the first direction; and
a flow barrier arranged along the first coolant pass and the second coolant pass to prevent bypass flow between the first and second coolant passes,
wherein the cooling plate further comprises a fluid manifold joined to one of the first plate and the second plate, wherein the manifold includes:
a planar top wall and a planar bottom wall spaced apart to define a fluid volume therebetween;
a non-planar wall extending along a length-wise direction of the fluid manifold between the planar top wall and the planar bottom wall to separate the fluid volume into a first portion and a second portion;
a coolant inlet port fluidly connected to the first portion of the fluid volume and the first coolant pass and a coolant outlet port fluidly connected to the second portion of the fluid volume and the second coolant pass;
a plurality of apertures arranged along the length-wise direction and extending through the planar bottom wall, successive ones of the plurality of apertures along the length-wise direction being fluidly connected to the first portion and to the second portion in alternating sequence,
wherein the fluid manifold includes a first plastic part that provides the planar top wall and a second plastic part that provides the planar bottom wall, and
wherein at least one of the coolant inlet port and coolant outlet port is provided by the second plastic part.

22. The cooling plate of claim 21, wherein the plurality of first mounting holes are aligned with the plurality of second mounting holes, and wherein the plurality of first mounting holes and the plurality of second mounting holes are fluidly separated from the coolant volume and are used to mount a heat producing device in a heat transfer relationship with one of the first plate or the second plate.

23. A cooling plate comprising:
a first plate including first edges defining a first perimeter, a plurality of first mounting holes, and a first planar surface extending in a length direction and in a width direction;
a second plate including second edges defining a second perimeter, a plurality of second mounting holes, and a second planar surface extending in the length direction and in the width direction, the first plate and the second plate joined at the first edges and the second edges such that the first and second planar surfaces are spaced apart to define a coolant volume therebetween, wherein the coolant volume includes a first coolant pass extending in a first direction, and
a second coolant pass extending in a second direction opposite the first direction; and
a flow barrier arranged along the first coolant pass and the second coolant pass to prevent bypass flow between the first and second coolant passes,
wherein the cooling plate further comprises a fluid manifold joined to one of the first plate and the second plate, wherein the manifold includes:
a planar top wall and a planar bottom wall spaced apart to define a fluid volume therebetween;
a non-planar wall extending along a length-wise direction of the fluid manifold between the planar top wall and the planar bottom wall to separate the fluid volume into a first portion and a second portion;
a coolant inlet port fluidly connected to the first portion of the fluid volume and the first coolant pass and a coolant outlet port fluidly connected to the second portion of the fluid volume and the second coolant pass;
a plurality of apertures arranged along the length-wise direction and extending through the planar bottom wall, successive ones of the plurality of apertures along the length-wise direction being fluidly connected to the first portion and to the second portion in alternating sequence,
wherein the fluid manifold includes a first plastic part that provides the planar top wall and a second plastic part that provides the planar bottom wall, and
wherein a first portion of the non-planar wall is provided by the first plastic part and a second portion of the non-planar wall is provided by the second plastic part.

24. The cooling plate of claim 23, wherein the first plastic part and the second plastic part are joined together to provide a leak-free seal around an outer perimeter of the fluid manifold.

25. The cooling plate of claim 23, wherein the plurality of first mounting holes are aligned with the plurality of second mounting holes, and wherein the plurality of first mounting holes and the plurality of second mounting holes are fluidly separated from the coolant volume and are used to mount a heat producing device in a heat transfer relationship with one of the first plate or the second plate.

26. A cooling plate comprising:
a first plate including first edges defining a first perimeter, a plurality of first mounting holes, and a first planar surface extending in a length direction and in a width direction;
a second plate including second edges defining a second perimeter, a plurality of second mounting holes, and a second planar surface extending in the length direction and in the width direction, the first plate and the second plate joined at the first edges and the second edges such that the first and second planar surfaces are spaced apart to define a coolant volume therebetween, wherein the coolant volume includes
a first coolant pass extending in a first direction, and
a second coolant pass extending in a second direction opposite the first direction; and
a flow barrier arranged along the first coolant pass and the second coolant pass to prevent bypass flow between the first and second coolant passes,
wherein the cooling plate further comprises a fluid manifold joined to one of the first plate and the second plate, wherein the manifold includes:
a planar top wall and a planar bottom wall spaced apart to define a fluid volume therebetween;
a non-planar wall extending along a length-wise direction of the fluid manifold between the planar top wall and the planar bottom wall to separate the fluid volume into a first portion and a second portion;
a coolant inlet port fluidly connected to the first portion of the fluid volume and the first coolant pass and a coolant outlet port fluidly connected to the second portion of the fluid volume and the second coolant pass;
a plurality of apertures arranged along the length-wise direction and extending through the planar bottom wall, successive ones of the plurality of apertures along the length-wise direction being fluidly connected to the first portion and to the second portion in alternating sequence, and
wherein centers of the plurality of apertures are arranged in a straight line extending along the length-wise direction.

27. A cooling plate comprising:
a first plate including first edges defining a first perimeter, a plurality of first mounting holes, and a first planar surface extending in a length direction and in a width direction;
a second plate including second edges defining a second perimeter, a plurality of second mounting holes, and a second planar surface extending in the length direction and in the width direction, the first plate and the second plate joined at the first edges and the second edges such that the first and second planar surfaces are spaced apart to define a coolant volume therebetween, wherein the coolant volume includes
a first coolant pass extending in a first direction, and
a second coolant pass extending in a second direction opposite the first direction; and
a flow barrier arranged along the first coolant pass and the second coolant pass to prevent bypass flow between the first and second coolant passes,
wherein the cooling plate further comprises a fluid manifold joined to one of the first plate and the second plate, wherein the manifold includes:
a planar top wall and a planar bottom wall spaced apart to define a fluid volume therebetween;
a non-planar wall extending along a length-wise direction of the fluid manifold between the planar top wall and the planar bottom wall to separate the fluid volume into a first portion and a second portion;
a coolant inlet port fluidly connected to the first portion of the fluid volume and the first coolant pass and a coolant outlet port fluidly connected to the second portion of the fluid volume and the second coolant pass;
a plurality of apertures arranged along the length-wise direction and extending through the planar bottom wall, successive ones of the plurality of apertures along the length-wise direction being fluidly connected to the first portion and to the second portion in alternating sequence, and
wherein the non-planar wall includes a first plurality of planar wall sections extending along the length-wise direction and offset to one side of the plurality of apertures, a second plurality of wall sections extending along the length-wise direction and offset to another side of the plurality of apertures, and a third plurality of wall sections joining ones of the first plurality of wall sections to ones of the second plurality of wall sections.

28. The cooling plate of claim 27, wherein one of the third plurality of wall sections is arranged between two adjacent ones of the plurality of apertures.

* * * * *